United States Patent [19]

Oliphant

[11] Patent Number: 4,573,592
[45] Date of Patent: Mar. 4, 1986

[54] MEANS TO REDUCE OSCILLATORY DEFLECTION OF VEHICLE

[75] Inventor: Larry J. Oliphant, Swisher, Iowa

[73] Assignee: Harnischfeger Corporation, West Milwaukee, Wis.

[21] Appl. No.: 732,891

[22] Filed: May 8, 1985

Related U.S. Application Data

[63] Continuation of Ser. No. 476,112, Mar. 17, 1983, abandoned.

[51] Int. Cl.[4] .............................................. B66C 23/26
[52] U.S. Cl. .................................... 212/182; 212/191; 212/238; 212/261; 188/380; 267/8 R; 267/136; 414/719
[58] Field of Search ............... 212/191, 238, 261, 182, 212/266, 271; 92/9; 244/104 FP; 188/379, 380; 267/64.12, 64.13, 8 R, 140.1, 136; 414/719, 720

[56] References Cited

U.S. PATENT DOCUMENTS

| 2,887,071 | 5/1959 | Settles | 188/379 |
| 3,426,651 | 2/1969 | Arendarski | 92/26 |
| 4,004,762 | 1/1977 | Jenkins | 244/104 FP |
| 4,088,286 | 5/1978 | Masclet et al. | 244/104 FP |
| 4,168,781 | 9/1979 | Bryan, Jr. | 414/719 |
| 4,317,524 | 3/1982 | Andersson | 212/261 |

FOREIGN PATENT DOCUMENTS

| 178690 | 8/1917 | Canada | 414/720 |
| 1090674 | 11/1967 | United Kingdom | 212/189 |

Primary Examiner—Galen Barefoot
Assistant Examiner—Thomas J. Brahan
Attorney, Agent, or Firm—James E. Nilles; Thomas F. Kirby

[57] ABSTRACT

A rough terrain vehicle comprises a vehicle chassis, resilient terrain-engaging wheel assemblies connected to the chassis and enabling vertical and angular deflection of the chassis relative to the terrain during vehicle movement, a telescopic crane boom carried by the chassis, a pivot pin for connecting the boom to the chassis and enabling limited reciprocable angular deflection of the boom relative to the chassis as the vehicle moves across supporting terrain and a hydraulic boom hoist cylinder to raise and lower the boom. A deflection reduction system is connected between the chassis and the boom to reduce or eliminate vertical and angular deflection (bouncing and porpoising) of the chassis relative to the terrain which tends to occur in response to dynamic loads imposed on the vehicle axles by movement across uneven terrain or by acceleration or deceleration of the vehicle. The deflection reduction system includes a resiliently compressible and expandable spring connected between the chassis and the boom and enables limited angular deflection of the boom relative to the chassis. The deflection reduction system further comprises a damping system connected between the chassis and the boom and to the spring to reduce the speed of spring motion as rapidly as possible to thereby dissipate the dynamic load. Preferably, the deflection reduction system is embodied in the boom hoist cylinder.

7 Claims, 16 Drawing Figures

MEANS TO REDUCE OSCILLATORY DEFLECTION OF VEHICLE

This application is a continuation of application Ser. No. 476,112, filed Mar. 17, 1983, now abandoned.

BACKGROUND OF THE INVENTION

1. Field of Use

This invention relates generally to means to reduce oscillatory deflection of a vehicle, such as a rough-terrain type mobile crane, in which the vehicle chassis tends to oscillate angularly and vertically or "porpoise" and bounce relative to the terrain over which the vehicle travels because of terrain roughness or because of rapid acceleration or deceleration of the vehicle.

2. Description of the Prior Art

Some prior art vehicles used in construction work, such as rough-terrain type mobile cranes, for example, comprise a chassis having ground-engaging tires and a large heavy component, such as a pivotable telescopic crane boom mounted thereon. The tires typically take the form of large resiliently compressible inflated balloon tires, which may or may not be provided with additional resilient suspension springs between the wheel axles and the chassis. These tires (and axle springs, if any) serve as a resilient support means which enable the chassis to move vertically (bounce or porpoise) relative to the terrain. When driven from one job site to another, the crane boom is lowered into a road transport position and is usually secured to the chassis. Characteristically, when such a vehicle is driven over rough terrain or is accelerating or decelerating rapidly, the heavy chassis with the heavy boom thereon tends to oscillate angularly or "porpoise" relative to the terrain over which the vehicle travels. Such deflection, which occurs at some uncontrolled natural mode and frequency of vibration, is possible because of the resilient support provided by the tires and/or suspension springs. Such deflection is undesirable for several reasons. It can cause dangerous lack of driver control at road speeds and can even cause the vehicle wheels to momentarily leave the ground. Furthermore, it is uncomfortable and dangerous for the vehicle driver within the cab. It also imposes undesirable stressful vertical and torsional dynamic load on the wheel axles and other vehicle components. Then, too, it can cause the vehicle to damage the road surface.

Efforts have been made to solve the specific problem of vehicle bouncing as it pertains to trucks, as is shown by U.S. Pat. No. 2,744,749. Efforts have also been made to solve the general problem of system vibration as shown by U.S. Pat. No. 3,322,379. However, none of the teachings of these patents are applicable to overcome the above-described problems.

SUMMARY OF THE PRESENT INVENTION

In accordance with the present invention there is provided means to reduce angular and translational deflection of a vehicle, such as a rough-terrain type mobile crane, for example, having a chassis resiliently supported on the terrain by balloon tires and/or axle suspension springs and on which a heavy component, such as a telescopic load-handling crane boom (hereinafter referred to as a boom) or the like, is mounted. The invention contemplates a chassis which, because of the resilient support of the chassis, tends to deflect angularly or "porpoise" or oscillate relative to the terrain over which the vehicle travels because of terrain roughness or because of acceleration or deceleration of the moving vehicle. The invention further contemplates that the component is movable vertically and angularly relative to the chassis.

For example, the component is an integral mass, such as a telescopic crane boom which is connected to the chassis as by a pivot assembly and is capable of reciprocating angular movement about a horizontal axis relative to the chassis by means such as a hydraulic boom hoist cylinder, which raises and lowers the boom.

The deflection reduction means or stabilizer means in accordance with the invention comprises resilient means, such as an auxiliary spring, connected between the chassis and the crane boom and damping means to control the velocity of compression and decompression of the auxiliary spring to thereby reduce or inhibit or prevent oscillatory deflections of the chassis relative to the terrain. The deflection reduction means operate to employ the angular movement of the boom relative to the chassis to generate natural modes of oscillation in which the oscillation of the boom is out of phase with the otherwise uncontrolled oscillation of the chassis (and any load thereon) relative to the terrain.

In an embodiment of the invention disclosed herein, the auxiliary spring and the damping means are preferably embodied in the boom hoist cylinder. In accordance with the invention, the boom, instead of being rigidly and immovably secured to the vehicle chassis during road transport as heretofore, is allowed to pivot to a limited degree about its horizontal axis. However, this angular motion is resisted by the auxiliary spring, and the damping means control the velocity of compression or decompression of the spring. The deflection reduction means provides optimum results when the speed of spring travel as it expands and contracts is controlled by the damping means, so that a load or force input on the vehicle axles is dissipated to heat at the fastest possible rate. The pivot axis and auxiliary spring location, as well as the characteristics of the auxiliary spring system and the damping means, are chosen or determined so that the previously uncontrolled natural modes of oscillation of the component are replaced with natural modes which are dynamically coupled to movement of the suspended mass relative to the vehicle chassis. The vibrational amplitude of the component and auxiliary system in any of its natural modes can then be controlled by adding damping of selected characteristics to the auxiliary spring system.

With such an arrangement, it is possible to control, reduce or eliminate the large oscillatory deflections and accelerations of the chassis associated with the road travel of a resiliently supported vehicle chassis. The invention is of particular importance when it is not possible or economically feasible, as in large mobile cranes, to provide damping by employing a conventional shock absorber arrangement for the axle springs of such vehicles.

A vehicle, such as a mobile crane, embodying a dynamic stabilization means in accordance with the invention for a telescopic boom mounted on the chassis thereof, offers numerous advantages over the prior art. For example, the chassis with the boom thereon does not vibrate or oscillate or "porpoise" excessively when passing over uneven or bumpy terrain or when accelerating or decelerating, thereby enhancing safety of vehicle operation, vehicle life, operator comfort and safety and reducing road surface damage. The damping means is embodied in existing vehicle components, such as the boom hoist cylinder, thereby reducing vehicle costs. The spring and damping means are easily adjustable to suit different vehicles and load conditions. The hydraulic-electrical control system is relatively uncomplicated, employs numerous conventional components, is economical to fabricate and easy to service. Other objects and advantages of the invention will hereinafter appear.

DESCRIPTION OF A PREFERRED EMBODIMENT

Figure 1:
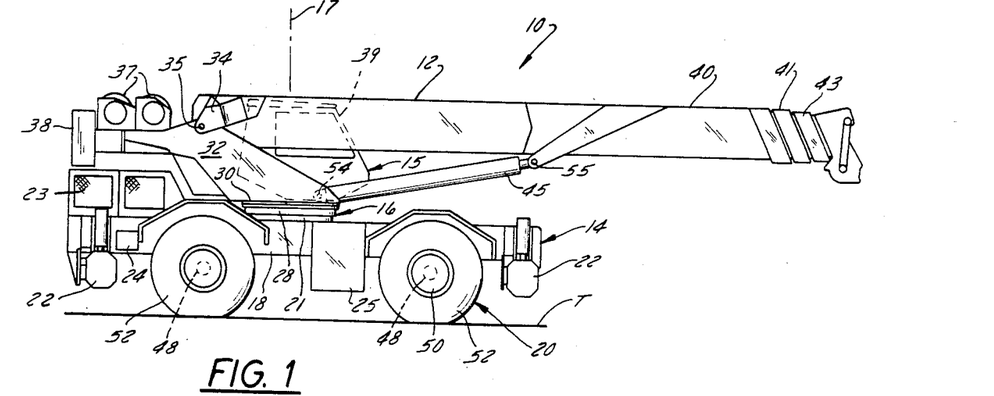
FIG. 1 is a side elevation view of a mobile crane embodying dynamic stabilization means in accordance with the present invention.
Figure 2:
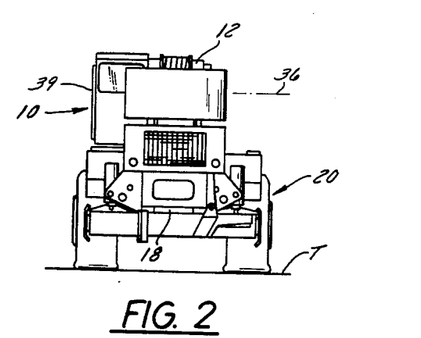
FIG. 2 is a rear end elevation view of the crane shown in FIG. 1.
Figure 3:
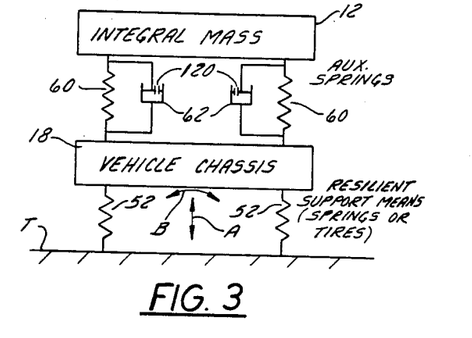
FIG. 3 is an elementary schematic diagram of certain components of the crane of FIGS. 1 and 2.

Referring to FIGS. 1 and 2, the numeral 10 designates a self-propelled vehicle, such as a mobile crane, which carries a large heavy component 12 in the form of a telescopic crane boom exhibiting the characteristics of an integral mass mounted on a chassis 18 of the vehicle. Vehicle 10 embodies dynamic stabilization means in accordance with the present invention to overcome any tendency for the chassis 18 (and the heavy component 12 mounted thereon) to oscillate angularly or "porpoise" or bounce relative to the terrain T over which the vehicle travels in response to dynamic loads resulting from terrain roughness or from rapid acceleration or deceleration of the vehicle 10. Vehicle 10 generally comprises a lower section 14 on which an upper section 15 is mounted by means of a slew ring assembly 16 for rotation in either direction to an unlimited degree about a vertical axis 17 during crane operation.

Lower section 14 comprises a chassis 18 on which are mounted four wheel assemblies such as 20, a fixed ring 21 of the aforesaid slew ring assembly 16, four extendible outriggers such as 22 for deployment during crane operation, a source of power 23 such as an internal combustion engine for providing operating power to the crane and for providing motive power for the wheel assemblies 20, an electric battery 24 for starting the engine 23, and a hydraulic fluid reservoir 25 for supplying operating fluid to certain vehicle and crane components.

Upper section 15 comprises a rotatable ring 28 of the aforesaid slew ring assembly 16 and a support frame 30 which is rigidly secured to ring 28. A boom support assembly 32 is rigidly mounted on support frame 30 and telescopic boom 12 is mounted by means of a pivot assembly 34, including a pivot pin 35, on support frame 30 for pivotal movement between raised and lowered positions about a horizontal axis 36 during crane operation. Telescopic boom 12 includes a base boom section 40, an inner boom section 41 telescopable within the base boom section, an outer boom section 42 telescopable within the inner boom section, and at least one hydraulic ram (not shown) for effecting extension and retraction of boom sections 41 and 42. Support frame 30 also affords support for two cable winches such as 37, a counterweight 38 and an operator's cab 39.

A pair of boom hoist cylinders such as 45, hereinafter described in detail, are each connected between boom support assembly 30 and base boom section 40 to raise and lower the telescopic boom 12 and each cylinder 45 also embodies dynamic stabilization means in accordance with the invention, as hereinafter explained.

Each wheel assembly 20 for chassis 18 of lower section 14 of vehicle 10 includes an axle 48, a wheel 50 rotatably mounted on the axle, and a resilient large inflated balloon tire 52 mounted on the wheel and engageable with the terrain T indicated in FIGS. 1 through 4, which may be a road surface or earth surface over which vehicle 10 is movable. In the embodiment shown in the drawings, axle 48 is secured to chassis 18 in such a manner that, while rotating and steering movement of the axle 48 may be possible, relative vertical motion between the axle 48 and the chassis 18 is not possible. However, the large inflated balloon tire 52 is resiliently compressible vertically downward to a certain extent in response to vertical loads imposed downwardly by the upper and lower sections 14 and 15, respectively, of vehicle 10. Tire 52 is also resiliently decompressible vertically upward in response to relieving of such a vertical load. As a result, the tire 52 serves as a resilient support means for chassis 18 and chassis 18 is resiliently movable vertically and angularly, both upwardly and downwardly in the direction of arrow A and angularly in the direction of arrow B shown in FIG. 3 relative to the terrain T as the vehicle 10 moves thereacross, as hereinafter explained.

In the embodiment shown, vehicle 10 is self-propelled and one or more axles 48 are adapted to be rotatably driven by engine 23 by suitable drive and power transmission means (not shown) to propel the vehicle 10. Furthermore, either two or four of the axles 48 are steerably movable by suitable steering means (not shown) to enable vehicle 10 to be steered while being driven. However, it is to be understood that the present invention can be embodied in a type of mobile crane which is mounted on a trailer type vehicle (not shown) which is not self-propelled but is adapted to be towed by another vehicle such as a truck (not shown). Furthermore, instead of relying solely on resilient tires 52 to enable relative vertical movement between chassis 18 and the terrain T, each axle 48 could be connected or secured to chassis 18 by a conventional axle spring (not shown) with or without conventional axle spring shock absorber (not shown) associated therewith to serve as another form of resilient support means for chassis 18 and to enable relative vertical motion between chassis 18 and the terrain T.

The pair of boom hoist cylinders such as 45 are operable to pivotably raise and lower telescopic boom 12 vertically about pivot pin 35. Each boom hoist cylinder 45 is connected at its lower end by a lower pivot pin 54 to a point P1 (see FIGS. 1 and 4) on boom support assembly 32 (and thus on chassis 18) and at its upper end by an upper pivot pin 55 to a point P2 (see FIGS. 1 and 4) on boom base boom section 40. As hereinafter explained, each boom hoist cylinder 45 is also constructed to embody portions of the dynamic stabilization means in accordance with the invention.

Operator's cab 39 houses certain control levers and switches, hereinafter identified, for actuating the stabilization means, as well as conventional controls for driving and steering the vehicle 10, for operating the crane upper section 15 and the crane boom 12 and for operating the outriggers 22.

Figure 4:
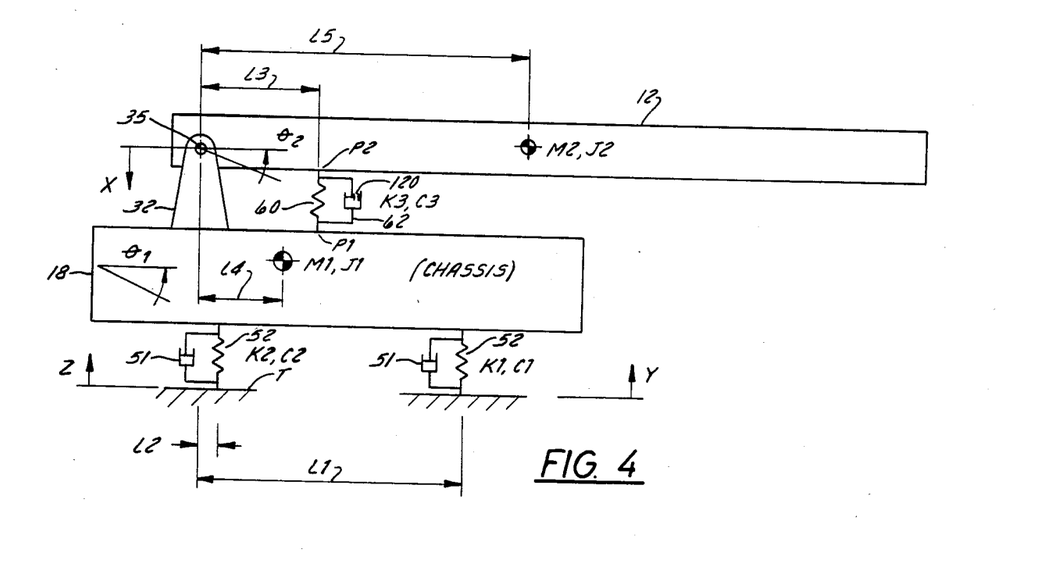
FIG. 4 is a more complex schematic diagram or mathematical model of certain components and physical relationships embodied in the crane of FIGS. 1 and 2.
Figure 5:
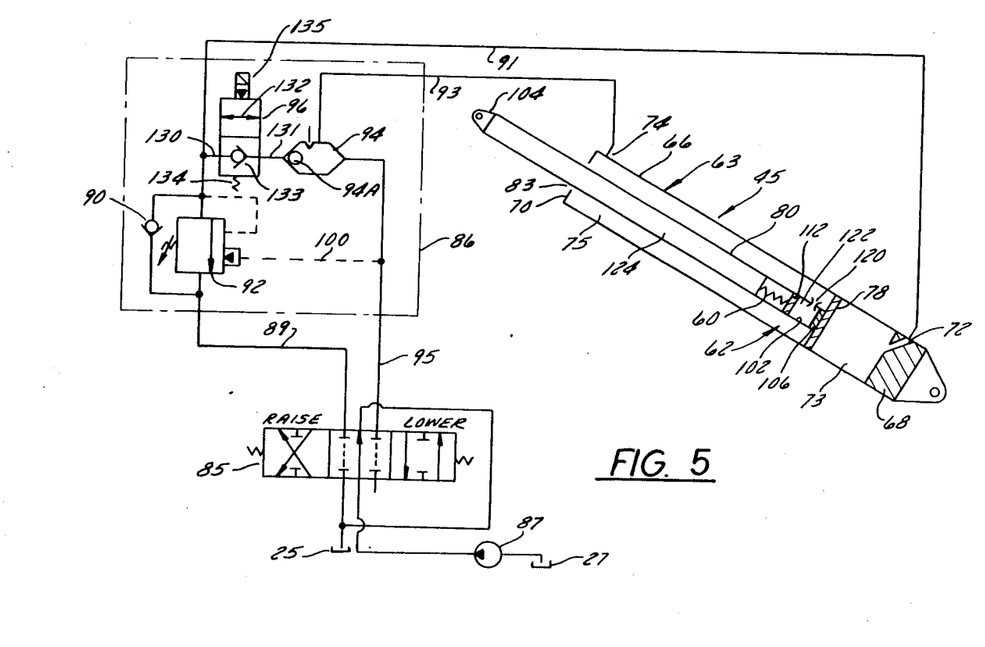
FIG. 5 is a simplified cross-section view of a boom hoist cylinder for the crane boom shown in FIGS. 1 and 2 and a schematic diagram of a hydraulic control circuit therefor, which cylinder and circuit also embody deflection damping means in accordance with the invention.
Figure 6:
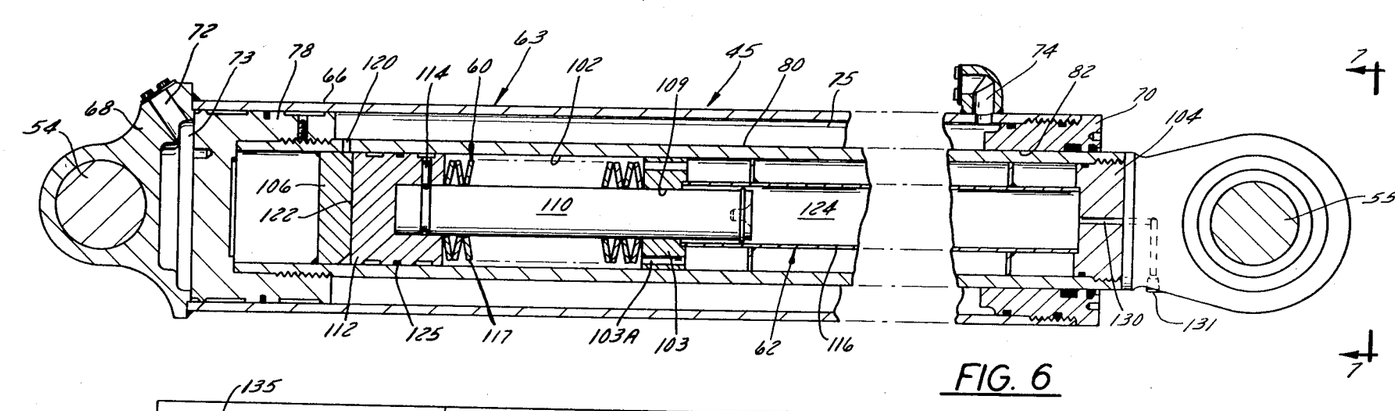
FIG. 6 is an enlarged more complete cross-section view of the cylinder shown in FIGS. 1, 2 and 5.

As FIGS. 3, 4, 5 and 6 show, the dynamic stabilization means generally comprises at least one auxiliary spring 60 (a pair of which are shown) effectively connected between the chassis 18 and the boom or component 12 to resist vertical and angular deflections therebetween, and damping means 62, including a cylinder housing 80, a piston assembly 112 therein in parallel with each spring 60 and a hydraulic fluid orifice to dampen the motion of the spring. In the embodiment of the invention disclosed herein, FIGS. 5 and 6 show a spring 60 and damping means 62 are economically and conveniently embodied in a boom hoist cylinder such as 45 which is provided for raising and lowering the boom 12.

Before providing a detailed explanation of the construction of the dynamic stabilization means, its operation should be generally understood. In accordance with the invention the component, such as a boom 12, instead of being rigidly and immovably secured to the vehicle chassis 18 during road transport as the conventional practice, is allowed to swivel, pivot or deflect angularly about the horizontal pivot axis of pin 35 in the pivot assembly 34 as the vehicle 10 tends to bounce or porpoise as it is propelled over the terrain T. However, this angular motion of boom 12 is controlled by the aforesaid spring 60 and damping means 62. The system is found to provide optimum results when the rate of spring force as spring 60 expands and contracts and the rate of damping force of the damping means 62, as well as the relative positions of the pivot axis of pin 35, spring 60, and other components are chosen so that a load or force input on the vehicle axles 48 is dissipated to heat at the fastest possible rate. The pivot axis of pin 35 and spring locations of spring 60, as well as spring and damping characteristics, are chosen or determined so that the previously uncontrolled natural modes of oscillation of chassis 18 are replaced with natural modes which are dynamically coupled to movement of the suspended mass or boom 12. The vibrational amplitude of the chassis in any of its natural modes can then be controlled by adding damping to the auxiliary spring system.

Figure 7:
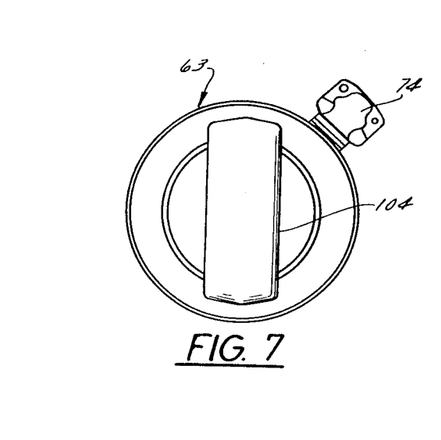
FIG. 7 is an end view of the cylinder taken on line 7—7 of FIG. 6.

Referring now to FIGS. 5, 6 and 7, it is seen that a boom hoist cylinder 45 with dynamic stabilization means embodied therein is constructed as follows. Cylinder 45 comprises an axially stationary cylinder housing assembly 63 and an axially movable main piston 78 slidably mounted thereon. Cylinder housing assembly 63 comprises a hollow outer cylinder 66 having an end cap 68 rigidly secured at one end and a piston rod seal 70 at and within its other end. End cap 68 comprises a fluid port 72 which communicates with one chamber 73 in outer cylinder 66. Cylinder 66 comprises a fluid port 74 which communicates with another chamber 75 in outer cylinder 66. The chambers 73 and 75 are separated by main piston 78 which is slidably mounted in the bore of outer cylinder 66. Main piston 78 is connected to a hollow piston rod 80 which extends outwardly of the said other end of outer cylinder 66 through a hole 82 in piston rod seal 70.

When pressurized hydraulic fluid is supplied through port 72 to chamber 73 in outer cylinder 66, piston 78 and its attached rod 80 are shifted toward boom hoist cylinder extend position, boom 12 is raised, and fluid is exhausted from chamber 75 out through port 74. Conversely, when pressurized hydraulic fluid is supplied through port 74 to chamber 75 in outer cylinder 66, piston 78 and its attached rod 80 are shifted toward boom hoist cylinder retract position, boom 12 is lowered, and fluid is exhausted from chamber 73 out through port 72.

Figure 8:
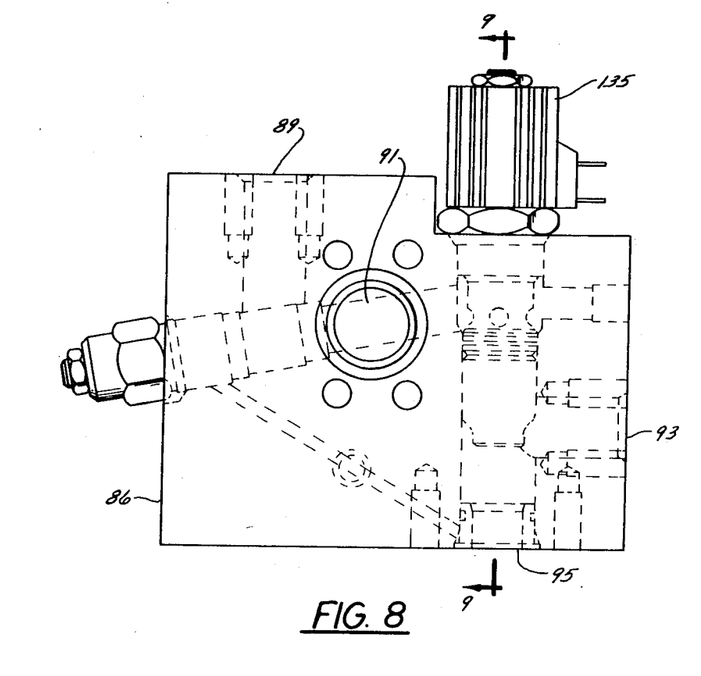
FIG. 8 is a side elevation view of a valve assembly shown schematically in FIG. 5.
Figure 9:
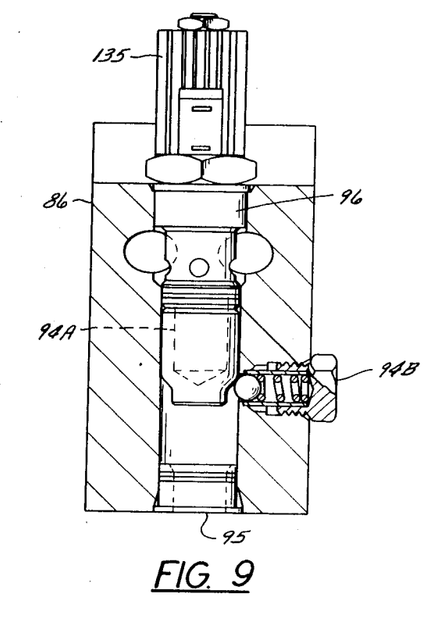
FIG. 9 is a cross-section view of the valve assembly taken on line 9—9 of FIG. 8.

Boom hoist cylinder 45 as thus far described is operable to raise and lower the boom 12 in response to operation of a hydraulic control system shown in FIG. 5. This control system comprises a manually operable, three-position (neutral, raise, lower), boom hoist directional control valve 85 for connecting the fluid ports 72 and 74 in main cylinder 66 to the hydraulic reservoir 25. The control system also comprises a valve assembly 86 (shown schematically in FIG. 5, in a top view in FIG. 8 and in section in FIG. 9) which includes a holding valve 92, an integral detented shuttle valve 94 including a shiftable spool 94A and detent assembly 94B, a solenoid-operated check valve 96, and necessary interconnecting fluid lines or passages. When valve 85 is shifted from its neutral position (shown in FIG. 5) to its raise position, a pump 87 (driven from engine 23) receives hydraulic fluid from reservoir 25 and supplies it under pressure through selector valve 85, through a fluid line 89, through one-way check valve 90 portion of holding valve 92 and through a fluid line 91 to port 72 of cylinder 66 to effect boom hoist cylinder extension. At the same time exhaust fluid from port 74 of cylinder 66 flows through a fluid line 93, through a shuttle valve 94, through a fluid line 95 and through a selector valve 85 to reservoir 25.

When selector valve 85 is shifted from neutral position to its lower position, pump 87 receives hydraulic fluid from reservoir 27 and supplies it under pressure through control valve 85, through shuttle valve 94, and through fluid line 93 to port 74 of cylinder 66 to effect boom hoist cylinder retraction. At the same time exhaust fluid from port 72 of cylinder 66 flows through fluid line 91, through holding valve 92 (which is shifted to open position when fluid line 95 is pressurized and supplies pilot pressure through a passage 100), through line 89 and through control valve 85 to reservoir 25.

When selector valve 85 is in neutral position as shown in FIG. 5, the holding valve 92 remains in closed position as shown in FIG. 5 and prevents hydraulic fluid from being exhausted from boom hoist cylinder chamber 73 and thereby preventing unintentional retraction of the boom hoist cylinder 45 under the weight of the boom 12 and any load thereon.

As FIGS. 3, 4, 5 and 6 further show, the dynamic stabilization means are embodied in boom hoist cylinder 45 and are constructed as follows. Piston rod 80 is hollow and has a cylindrical bore 102 therein which is closed at the outer end of the rod by an end cap 104 rigidly secured to the rod. The bore 102 is closed at the inner end of the rod 80 by a rigidly secured end plate 106. A support ring 103 is rigidly mounted within the cylindrical bore 102 in piston rod 80 and is located between the end cap 104 and the end plate 106. Support ring 103 has a hole 109 therethrough for accommodating a solid cylindrical spring guide 110 which is slidably mounted therein. Ring 103 has gas passages 103A therein. An auxiliary piston 112 is rigidly secured to one end of spring guide 110 by a set screw 114 and is slidable in bore 102 in piston rod 80. A hollow tube spacer 116 is mounted in bore 102 and is rigidly connected at one end to support ring 103 and at its other end to end cap 104. Spacer 116 serves to insert and position support ring 103 in bore 102. A plurality of Bellville type spring washers 117 are mounted on spring guide 100 and fill the space between support ring 103 and auxiliary piston 112 and, in the position shown in FIG. 6, are under slight compression.

The washers 117 taken together correspond to the hereinbefore referred to auxiliary spring 60. Piston rod 80 is provided at its innermost end with hydraulic fluid passage 120 (which also extends through end plate 106) to afford communication between hydraulic fluid chamber 75 in outer cylinder 66 and a chamber 122 within bore 102 between end wall 106 and auxiliary piston 112. Chamber 122 is shown in FIG. 5 but is shown completely occupied in FIG. 6. Piston rod 80 also includes another chamber 124 which occupies the remainder of bore 102. Chamber 124 is sealed off from chamber 122 by a T-seal 125 on auxiliary piston 112 and is filled with pressurized gas, such as nitrogen, which is initially introduced through a passage 130 in end cap 104 and which is closed off by a threaded plug 131. The pressurized gas, for example, is maintained at a pressure of about 800 psi in a cylinder 45 which is on the order of twelve feet long when unextended. The pressurized gas acts to force or bias piston 112 leftward (in FIG. 6), as do the spring washers 117, and thus serves to enable the use of smaller (less forceful) washers 117 which would otherwise be required by exerting a nearly constant force on piston 112.

Referring again to FIGS. 5, 8, 9 and 10, it is seen that the solenoid-operated check valve 96 includes valve ports 130, 131, a passage 132, a one-way check valve 133, a biasing spring 134 which normally biases the check valve 133 between the ports 130 and 131, and a solenoid 135 energizable to shift passage 132 between the valve ports 130 and 131. Energization and deenergization of solenoid 135 is controlled by the electrical control circuit shown in FIG. 14 and hereinafter described in detail. It is to be understood that solenoid 135 is energized to bring the deflection reducing or stabilizer apparatus in cylinder 45 into play after boom 12 has been lowered to a road transport position which is about 10° above its lowest possible substantially horizontal position by operation of the boom hoist operating or control valve 85 and the latter is returned to its neutral position (see FIG. 5). Energization of solenoid 135 shifts passage 132 between the valve ports 130 and 131 and causes the spool 94A in shuttle valve 94 to shift rightward (with respect to FIG. 5) past detent 94B and establishes a closed hydraulic circuit as follows: from chamber 73 of outer cylinder 66 of boom hoist cylinder 45, through port 72, through line 91, through passage 132 in solenoid check valve 96, through shuttle valve 94, through line 93, and through cylinder port 74 to chamber 75 in outer cylinder 66 of boom hoist cylinder 45.

As is apparent, outer cylinder chamber 75 is in communication through port, passage or orifice 120 with chamber 122 in hollow cylinder rod 80. Consequently, if road or driving conditions affecting vehicle 10 tend to cause angular deflection (up or down) of boom 12 about pivot pin 35 and relative to chassis 18, then hydraulic fluid in chamber 75, being trapped in the aforesaid closed hydraulic system, is forced out of or into chamber 122, depending on the direction of boom motion, and the spring 60 made up of the washers 117 is able to decompress or to further compress, depending on the direction of boom motion. The diameter of the orifices or passages 120 and 132, which are designed to be the smallest in the system, operate to control the rate of transfer or the rate of fluid flow in the system and thereby assist in controlling the rate at which the spring 60 can compress or decompress. This has the effect of damping or dissipating the motion of boom 12 relative to chassis 18.

Figure 10:
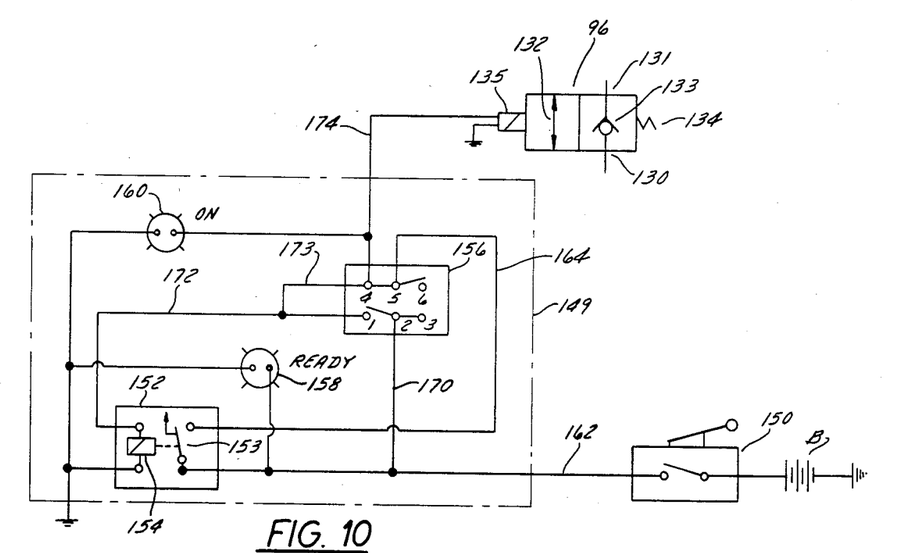
FIG. 10 is a schematic diagram of an electric control circuit for use with the valve assembly shown in FIGS. 5, 8 and 9.
Figure 11:
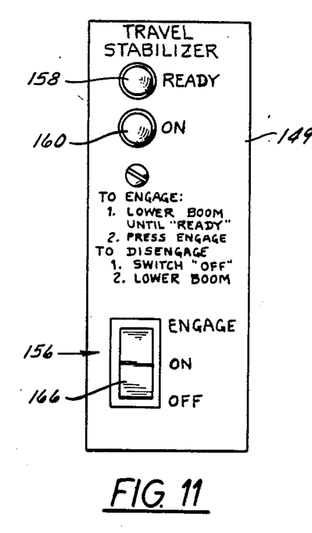
FIG. 11 is an enlarged front elevation view of a control panel on which certain of the electrical components shown in FIG. 10 are mounted.
Figure 12:
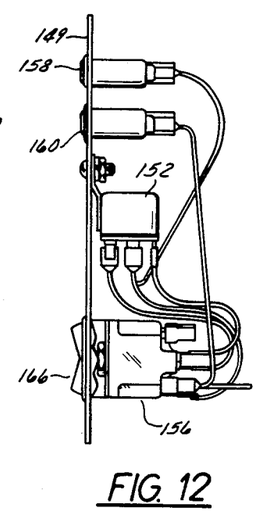
FIG. 12 is a side elevation view of the panel shown in FIG. 11.
Figure 13:
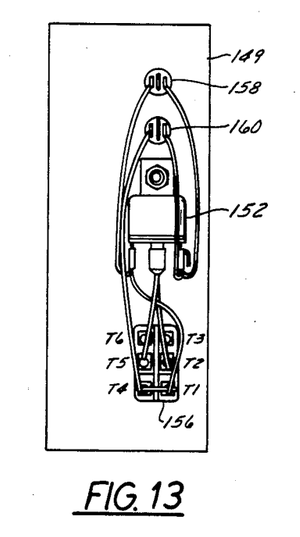
FIG. 13 is a rear elevation view of the panel shown in FIGS. 11 and 12.
Figure 14:
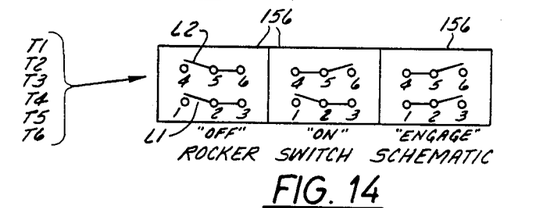
FIG. 14 is a schematic diagram showing three contact positions for an electric rocker switch shown in FIGS. 10 through 13.

Referring to FIG. 10, the electrical control system for the solenoid 135 of stabilizer valve 96 is seen to comprise a source of electrical power, such as a battery B, a normally open single pole single throw boom position responsive limit switch 150, and a panel board 149 on which are mounted a normally open single pole relay 152 comprising a normally open relay contact 153 and a relay coil 154, a rocker switch 156 having "off", "on" and "engage" positions, a "ready" light 158, and an "on" light 160. As FIGS. 10 and 14 show, rocker switch 156 comprises six terminals designated T1, T2, T3, T4, T5 and T6 and two tiltable switch leaves L1 and L2 which are actuatable by a manually operable toggle button 166 to the "off", "on" and "engage" positions. In "off" position leaf L1 connects terminals T2 and T3 and leaf L2 connects terminals T5 and T6. In "on" position leaf L1 connects terminals T2 and T3 and leaf L2 connects terminals T4 and T5. In "engage" position leaf L1 connects terminals T1 and T2 and leaf L2 connects terminals T4 and T5. Battery B has one terminal grounded and the other terminal connected to one side of limit switch 150 which is located in association with boom 12 and adapted to close when the boom is lowered to 10 degrees or less. The other side of limit switch 150 is connected by an electrical conductor or wire 162 to one side of relay contact 154. The other side of relay contact 154 is connected by an electrical conductor or wire 164 to switch terminal T5. Conductor 162 is connected by a conductor or wire 170 to switch terminal T2. Relay coil 164 has one side connected to ground and has its other side connected by conductors or wires 172 and 173 to switch terminals T1 and T4, respectively. One side of solenoid coil 153 is connected by a conductor or wire 174 to switch terminal T4 and has its other side connected to ground. The "on" light 160 is connected between conductor 174 and ground and turns on when rocker switch 156 is turned to "engage" and the relay contacts 154 are closed and solenoid 135 is energized. The "ready" light 158 is connected between conductor 162 and ground and turns on when limit switch 150 closes.

In operation, closure of limit switch 150 by proper placement of boom 12 (i.e., 10° from its lowermost position) turns on "ready" light 158. If toggle switch 156 is "off" or "on", relay coil 154 and solenoid 135 remain deenergized. If toggle switch 156 is in "engage", relay coil 154 is energized, and relay contact 153 closes to energize solenoid 135 and enable operation of the stabilizer system as hereinbefore described.

Turning now to FIG. 4, there are depicted significant points, relationships and distances which enable the stabilization means to function at is optimum in accordance with the following mathematical model using formulae of motion wherein distances are in feet and masses are in slugs, i.e., $$\text{slugs} = \frac{\text{Pounds}}{\text{Gravitational Acceleration (32.2)}}$$

In the formulae:

L1 is the horizontal distance between the front wheel axle 48 and the boom pivot 35;

L2 is the horizontal distance between pin 35 and rear axle;

L3 is the distance between the axis of pivot pin 35 and the axial centerline of cylinder 45;

L4 is the horizontal distance between the axis of pivot pin 35 and the center of mass of chassis 18 and its appurtenances;

M1 is the mass of chassis 18 and its appurtenances;

J1 is the principal mass moment of inertia about an axis through the center of mass M1;

M2 is the mass of boom 12 and its appurtenances;

J2 is the principal mass moment of inertia about an axis through the center of mass M2;

$\theta 1$ is the deflection angle of the chassis 18;

$\theta 2$ is the deflection angle of boom 12;

K1, K2 and K3 are respective spring rates in pounds per foot;

C1, C2 and C3 are damping rates in pounds x seconds/per foot;

X, Y and Z represent vertical deflections and the associated arrows show the direction.

In the following mathematical model or formulae for equations of motion:

$\Sigma F$ is the summation of forces;

$\Sigma M1$ is the summation of moments for the rotation of mass M1; about the boom base pivot pin and $\Sigma M2$ is the summation of moments for the rotation of mass M2 about the boom base pivot pin.

Thus:

$$\Sigma F \begin{cases} (M1 + M2)\ddot{x} - (M1 * L4)\ddot{\theta}_1 - (M2 * L5)\ddot{\theta}_2 + (C1 + C2)\dot{x} - (C1 * L1 + C2 * L2)\dot{\theta}1 \\ + (K1 + K2)\bar{x} - (K1 * L1 + K2 * L2)\theta 1 + \text{For} + AK1 * Y + AK2 * Z = 0.0 \end{cases}$$

$$\Sigma M1 \begin{cases} (-M1 * L4)\ddot{x} + (J1 + M1 * L4^2)\ddot{\theta}1 - (C1 \times L1 + C2 * L2)\dot{X} + (C1 * L1^2 + C2 * L2^2 + \\ C3 * L3^2)\dot{\theta}1 - (C3 * L3^2)\dot{\theta}2 (K1 * L1 + K2 * L2)X + (K1 * L1^2 + K2 * L2^2 + K3 * L3^2)\theta 1 \\ - (K3 * L3^2)\theta 2 + TOR - (K1 * Y * L1 + K2 * Z * L2) = 0.0 \end{cases}$$

$$\Sigma M2 \begin{cases} (-M2 * L5)\ddot{x} + (J2 + M2 * L5^2)\ddot{\theta}2 - (C3 * L3^2)\dot{\theta}1 + (C3 * L3^2)\dot{\theta}2 \\ (-K3 * L3^2)\theta 1 + (K3 * L3^2)\theta 2 = 0.0 \end{cases}$$

In a typical case involving a mobile crane of specific size and weight and having the input variables listed below, solution of the equations by the Jacobi method resulted in derivation of Eigen values representing three frequencies of vibration and Eigen vectors defining three modes of vibration. The three frequencies Nos. 1, 2 and 3 shown below pertain to the vertical deflection X, and angular deflections $\theta 1$ and $\theta 2$ FIG. 4. The matrixes A and B specified below are to be understood to be intermediate steps in deriving the Eigen values and vectors. The node locations specified below signify a point at that distance from the boom pivot at which rotation about the point but no vertical translation would occur.

The input variables AK1, AK2, AK3, AL1, AL2, AL3, AL4, AL5, AM1, AJ1, AM2, AJ2, respectively, are:

132000.00  132000.00  200000.00  11.5000  1.0800  4.6000  3.6300
14,5800  1240.90  74543.00  388.90  34481.00

The following is the defined Matrix A:

264000.0000   −1660560.0000   0.0
−1660560.0000   21842964.8000   −4232000.0000
0.0   −4232000.0000   4232000.0000

The following is the defined Matrix B:

1629.8000   −4504.4670   −5670.1620
−4504.4670   90894.2152   0.0
−5670.1620   0.0   117151.9620

Frequency No. 1 is 1,5322 HZ
The Eigen Vector is 0.9768  0.0957  0.0164
The Machine Node Location is 10.211
The Boom Mode Location is 59.618
The Amplitude Ratio Theta1/Theta2 is 5.839
Frequency No. 2 is 2.6845 HZ
The Eigen Vector is −4.7572  0.8560  −0.3882
The Machine Node Location is −5.557
The Boom Node Location is 12.255
The Amplitude Ratio Theta1/Theta2 is −2.205
Frequency No. 3 is 0.7984 HZ
The Eigen Vector is 1.9159  0.3686  1.0030
The Machine Node Location is 5.197
The Boom Node Location is 1.910
The Amplitude Ratio Theta1/Theta2 is 0.368

Figure 15:
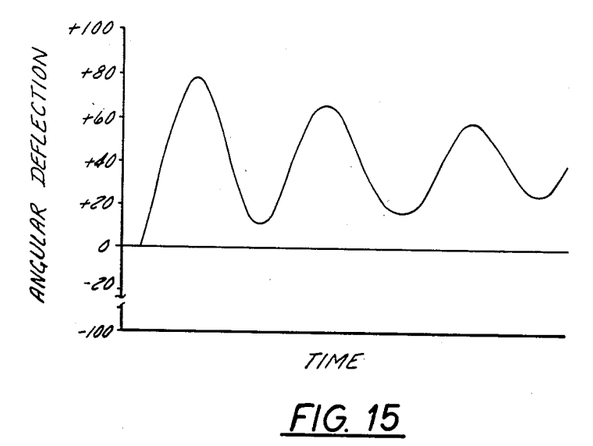
FIG. 15 is a graph depicting the typical oscillation or angular deflection of a chassis in a crane not employing stabilization means.
Figure 16:
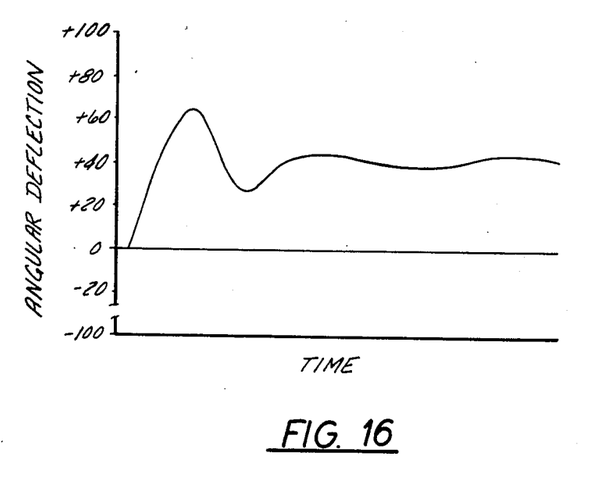
FIG. 16 is a graph depicting the typical oscillation effect of dynamic stabilization means in accordance with the invention.

Referring to FIGS. 15 and 16, there are shown graphs which exemplify, in FIG. 15, a mode or oscillation that occurs in a mobile crane not embodying the present invention and, in FIG. 16, a highly attenuated oscillation that results in a mobile crane which does embody the present invention. In applicant's system, generated modes of oscillation employ the phase difference between chassis and boom rotation effect reduction of bounce and porpoising.

I claim:

1. A vehicle (10) movable across terrain (T) and comprising:

a first mass including a vehicle chassis (18);

resilient support means including terrain-engaging wheel assemblies (20) connected to said chassis (18) and enabling reciprocable vertical and angular deflection of said chassis (18) relative to said terrain (T) as said vehicle (10) moves thereacross;

a second mass including a load-handling boom component (12) carried by said chassis (18) and independently movable relative to said resilient support means, said first mass being greater than said second mass;

means for movably connecting said load-handling boom component (12) to said chassis (18) and enabling reciprocable vertical angular deflection of said component (12) relative to said chassis (18) as said vehicle (10) moves across said terrain (T);

and deflection reduction means connected between said chassis (18) and said load-handling boom component (12) to reduce vertical and angular deflection of said chassis (18) relative to said terrain (T) tending to occur in response to dynamic loads imposed on said vehicle (10) by movement across uneven terrain (T) or by acceleration or deceleration of said vehicle (10);

said deflection reduction means including resiliently compressible and expandable load-bearing spring means (60) connnected between said chassis (18) and said load-handling boom component (12) and responsive to and tending to enable limited vertical angular deflection of said load-handling boom component (12) relative to said chassis (18) which would cause spring motion at a predetermined rate of speed in response to said dynamic loads, and said deflection reduction means further comprising damping means (62) connected between said chassis (18) and said load-handling boom component (12) and to said spring means (60) to reduce the rate of speed of spring motion as rapidly as possible to thereby dissipate said dynamic loads.

2. A vehicle (10) according to claim 1 including lift means (45) connected between said chassis (18) and said load-handling boom component (12) and selectively operable to effect vertical angular movement of said load-handling boom component (12) relative to said chassis (18).

3. A vehicle according to claim 2 wherein said deflection reduction means (60, 62) is embodied in said lift means (45).

4. A vehicle (10) according to claim 1 or 2 or 3 wherein said chassis (18) and load-handling boom component (12) tend to deflect vertically in natural modes of oscillation and wherein said deflection reduction means (60, 62) causes oscillation of load-handling boom component (12) which is out of phase with said chassis (18) in said natural modes and thereby reduces deflection of said chassis (18) relative to said terrain (T).

5. A vehicle (10) according to claim 3 wherein said lift means (45) comprises an outer cylinder (66) having a main bore, a main piston (78) slidably mounted in said main bore and dividing said main bore into two chambers (73, 75) a piston rod (80) connected to said main piston (78) and extending from an end of said outer cylinder (66), and means (87, 85, 86) for supplying hydraulic fluid to said chambers (73, 75) to operate said lift means (45);

and wherein said deflection reduction means (60, 62) comprises a secondary bore (102) in said piston rod (80), a secondary piston (112) slidably mounted in said secondary bore (102) and dividing said secondary bore (102) into two chambers (122, 124), biasing means (60) in said secondary bore (102) for biasing said secondary piston (112) in a predetermined direction, and a passage (120) communicating between one of of said chambers (75) in said main bore and one of said chambers (122) in said secondary bore (102) for admitting fluid to said last-recited chamber (122) to act against the bias of said biasing means (60).

6. A vehicle (10) according to claim 5 wherein said biasing means (60) comprises spring means (60) and a pressurized compressible gas which is entrapped in the other of said chambers (124) in said secondary bore (102).

7. A vehicle according to claim 1 which is a mobile crane and wherein said load-handling boom component is a crane boom.

* * * * *